United States Patent [19]

Bourgeois

[11] 4,130,193
[45] Dec. 19, 1978

[54] TRANSFER SYSTEM FOR CONVEYOR SYSTEMS

[76] Inventor: Ronald D. Bourgeois, 138 Ellison Park, Waltham, Mass. 02154

[21] Appl. No.: 790,466

[22] Filed: Apr. 25, 1977

[51] Int. Cl.² .............................................. B65G 47/46
[52] U.S. Cl. .................................... 198/369; 198/425; 198/436; 198/457; 198/459; 198/576; 198/592; 198/601
[58] Field of Search ............... 198/356, 358, 366, 368, 198/369, 425, 436, 437, 456, 457, 459, 460, 578, 601, 491, 576, 592, 585, 841; 271/64, 182, 229, 230, 256, 258

[56] References Cited

U.S. PATENT DOCUMENTS

| 1,352,263 | 9/1920 | Harding | 198/841 X |
| 2,497,874 | 2/1950 | Evans et al. | 198/369 X |
| 3,217,859 | 11/1965 | Bartlo et al. | 198/425 |
| 3,353,652 | 11/1967 | Fellner | 198/491 X |
| 3,724,657 | 4/1973 | Katajiri et al. | 271/64 X |

FOREIGN PATENT DOCUMENTS

| 268144 | 1/1969 | Austria | 198/592 |
| 2421610 | 11/1974 | Fed. Rep. of Germany | 198/436 |
| 472080 | 5/1975 | U.S.S.R. | 198/369 |

Primary Examiner—Robert B. Reeves
Assistant Examiner—James L. Rowland
Attorney, Agent, or Firm—Joseph S. Iandiorio

[57] ABSTRACT

An interrupter unit for producing a gap in the normal flow of product along a conveyor belt system, including a drive member and an actuator member responsive to the drive member for raising a limited portion of the conveyor belt of the conveyor belt system to produce an inclination of the conveyor belt to prevent further progress of conveyed objects; a transfer unit for transferring conveyed objects between first and second conveyor belt systems, one of the first and second conveyor belt systems being a transferor system, the other a transferee system including a rotatable support section for carrying at least a portion of the conveyor belt of the first conveyor belt system and having a free end and an end rotatably interconnected with the support structure of the first conveyor belt system, and a drive mechanism for rotating the support section between a retracted position and an inclined position bridging the first and second conveyor belt systems, with the conveyor belt of the first conveyor belt system at the free end of the section in close conveying proximity to the conveyor belt of the second conveyor belt system.

8 Claims, 13 Drawing Figures

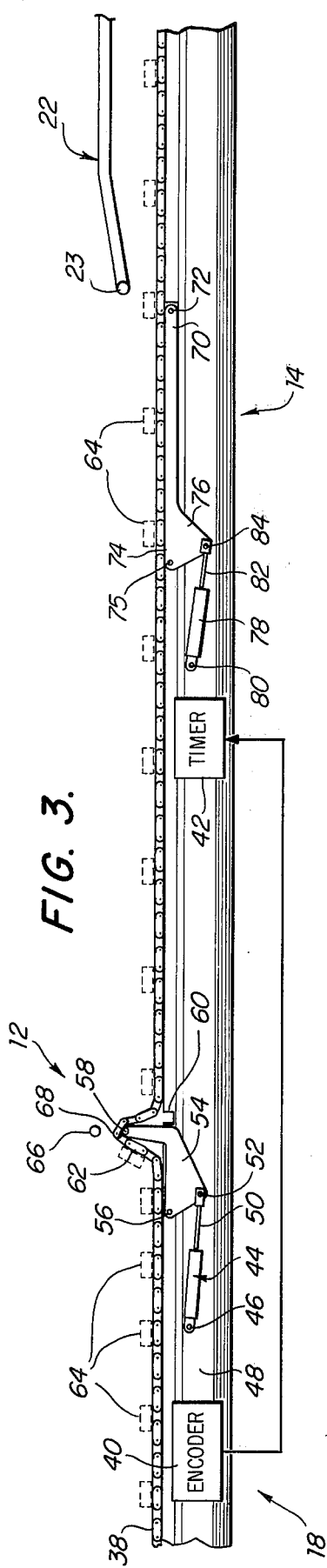
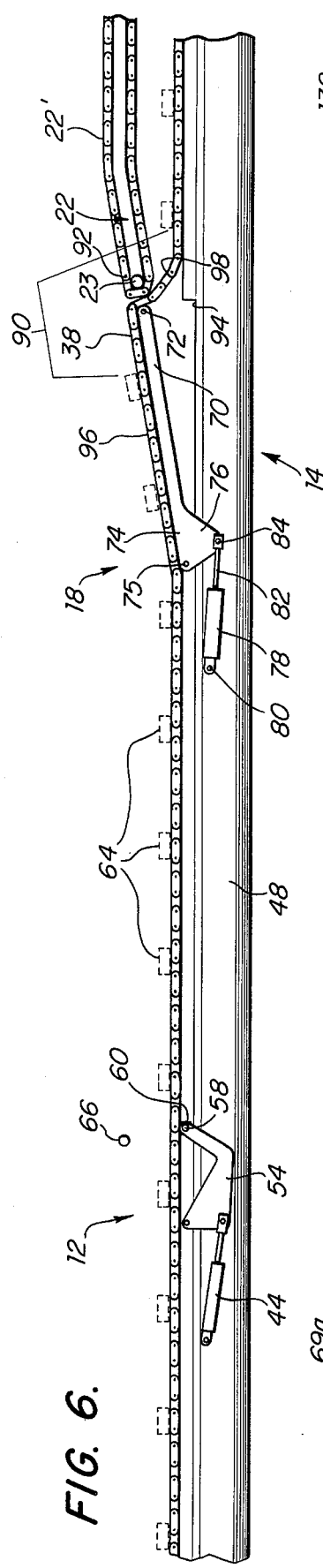
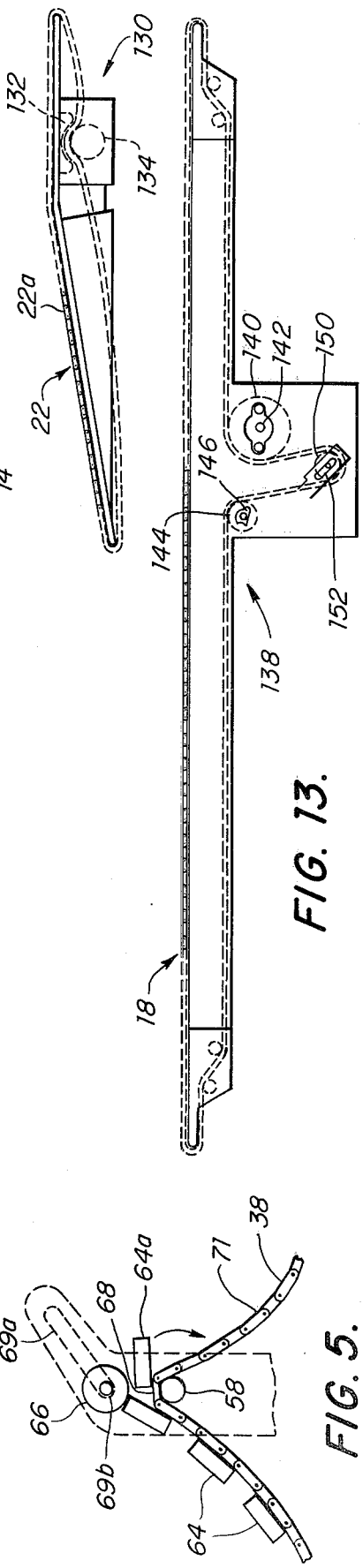
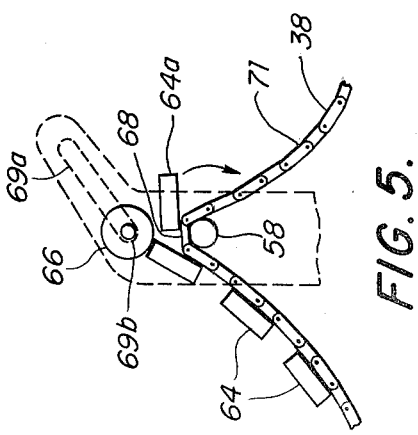
FIG. 3.
FIG. 6.
FIG. 13.
FIG. 5.

TRANSFER SYSTEM FOR CONVEYOR SYSTEMS

FIELD OF INVENTION

This invention relates to a transfer unit and to an interrupter unit and to a transfer system utilizing both units for selective transferring of goods between a transferor conveyor belt system and one or more transferee conveyor belt systems.

BACKGROUND OF INVENTION

Selective transfer of goods between a primary, transferor conveyor and one or more secondary, transferee conveyors is accomplished in a number of ways. Typically, some additional equipment other than the transferor and transferee conveyors are used, such as a third intermediate conveyor belt system, a skid plate or belt which requires two transitions for the conveyed goods — one from the transferor conveyor to the intermediate device and a second from the intermediate device to the transferee conveyor. Such transition points are likely trouble points. Other equipment for transferring goods between conveyors includes guide members or vanes which permanently or periodically steer goods from a transferor conveyor to one or more other transferee conveyors. Jamming of the goods is a common problem. Although the positioning of the guides, whether permanent or periodic, may be satisfactory or optimum for one size of goods, it may not be so for all sizes. In applications where the guides are permanently placed to channel goods to a number of different transferee conveyor belt systems, the full flow of the transferor conveyor must be divided to supply each of the transferee conveyors. In those where the guides are used selectively, periodically, there is required a more complex operating mechanism and there arises the real possibility of jamming or damage to the goods. In addition, periodic introduction and removal of guides is usually accompanied by a gate or similar interrupter device for halting flow of goods to prevent damage to goods during movement of the guide or guides. Such gating devices add another level of complexity to the conveyor systems and in fact may themselves cause damage to the goods as they seek to arrest the flow, and often are less than totally able to stop the flow.

SUMMARY OF INVENTION

It is therefore an object of this invention to provide an improved transfer unit for transferring goods between a transferor conveyor belt system and one or more transferee conveyor belt systems.

It is a further object of this invention to provide an interrupter unit for producing a gap in the flow of goods along a conveyor belt system.

It is a further object of this invention to provide a transfer system which utilizes at least one such transfer unit and interrupter unit.

It is a further object of this invention to provide such a transfer unit which requires no additional intermediate conveyors or devices to accomplish the transfer between conveyors, and which is capable of transferring the full flow from the full width of the transferor conveyor.

It is a further object of this invention to provide such a transfer unit which requires no guides or other diverting mechanisms and works well on all sizes of conveyed goods without jamming or damage to the goods.

It is a further object of this invention to provide an interrupter unit which requires no external gates, does not damage the goods and is wholly effective to halt the flow of goods.

The invention results from the realization that the conveyor belt of the transferor conveyor belt system can be raised and lowered to provide inclines and declines to cause an interruption in the flow of goods and that the conveyor belt of either or both the transferor and transferee systems can be inclined or declined to divert the flow of goods from the transferor to the transferee conveyor belt.

This invention features an interrupter unit for producing a gap in the normal flow of product along a conveyor belt system. It includes drive means and actuator means responsive to the drive means for raising a limited portion of the conveyor belt of the conveyor system to produce an inclination of the conveyor belt to prevent further progress of conveyed objects.

Control means may be used for enabling the drive means to operate the actuator means to raise the conveyor belts and create the gap in the flow of product. In addition, a blocking member may be disposed closely adjacent to the crest of the conveyor belt in the raised position for further preventing progress of the conveyed objects.

The invention also features a transfer unit for transferring conveyed objects between first and second conveyor belt systems, one of which is the transferor system and the other the transferee system. This transfer unit includes a rotatable support section for carrying at least a portion of the conveyor belt of the first conveyor belt system and having a free end and an end rotatably interconnected with the support structure of the first conveyor belt system. There is a drive mechanism for rotating the support section between a retracted position and an inclined position bridging the first and second conveyor belt systems with the conveyor belt of the first conveyor belt system at the free end of the section being in close conveying proximity to the conveyor belt of the second conveyor belt system.

The transfer unit may include control means for enabling the drive system to retract and rotate the rotatable support section.

The invention also features a transfer system which includes at least one interrupter unit and one transfer unit, and control means for synchronously operating the interrupter unit and the transfer unit. In individual transfer and interrupter units, the control means may include an encoder driven by motion of the conveyor belt, or some other timing device driven by external timing signals. In a transfer system using one or more interrupter units and transfer units, the control means may include a single encoder or an encoder associated with each of the units, and suitable timing means may be used to synchronize the operation of each of the associated interrupter and transfer units.

DISCLOSURE OF PREFERRED EMBODIMENT

Other objects, features and advantages will occur from the following description of a preferred embodiment and the accompanying drawings, in which:

FIG. 3 is a more detailed elevational view of a conveyor belt system employing an interrupter unit and transfer unit according to this invention;

FIG. 5 is an enlarged elevational view showing the location of the blocking member portion of the interrupter unit;

FIG. 6 is a view similar to FIG. 3 with the transfer unit in the raised, inclined position;

FIG. 13 is a diagrammatic, side elevational view showing parts of the drive units on a transferee and transferor conveyor system according to this invention.

Figure 1:
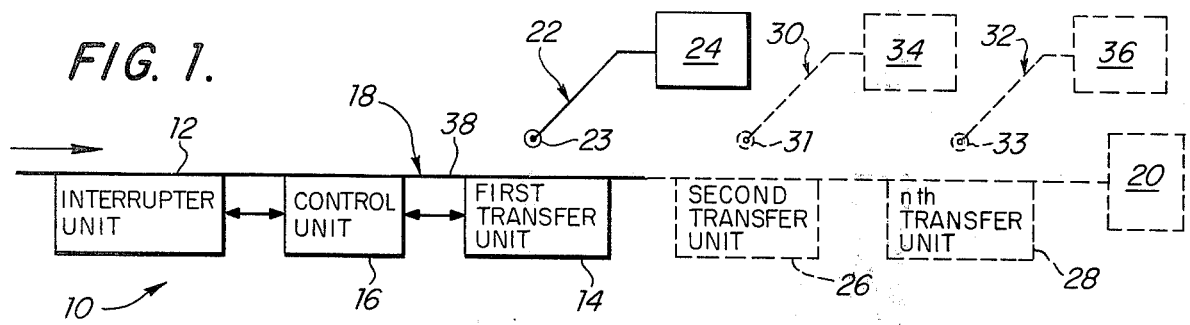
FIG. 1 is a schematic elevational view of transferor and transferee conveyor belt systems provided with a transfer system according to this invention.

There is shown in FIG. 1 a transfer system 10 according to this invention which includes an interrupter unit 12, first transfer unit 14 and a control unit 16 which may form a part of the interrupter unit and transfer unit. The interrupter unit 12, control unit 16, and first transfer unit 14 are associated with the transfer conveyor 18, which passes objects directly to a machine 20 at its remote end or, alternatively, may transfer conveyed objects to transferee conveyor 22, which delivers them to another machine 24. Second transfer unit 26, and subsequent units up to nth transfer unit 28, are similarly employed to divert the flow of goods to transferee conveyors 30 and 32, which deliver the goods to machines 34 and 36, respectively.

Transferee conveyors 22, 30 and 32 carry spacer wheels 23, 31, and 33, respectively, at their free ends for ensuring close but not interfering positioning of those conveyors with selected positions of conveyor 38. Control unit 16 includes an encoder driven by belt 38 of transferor conveyor belt system 18 and may include one or more timing devices to ensure synchronous operation of first transfer unit 14 and any additional transfer units with interrupter unit 12.

Figure 2:
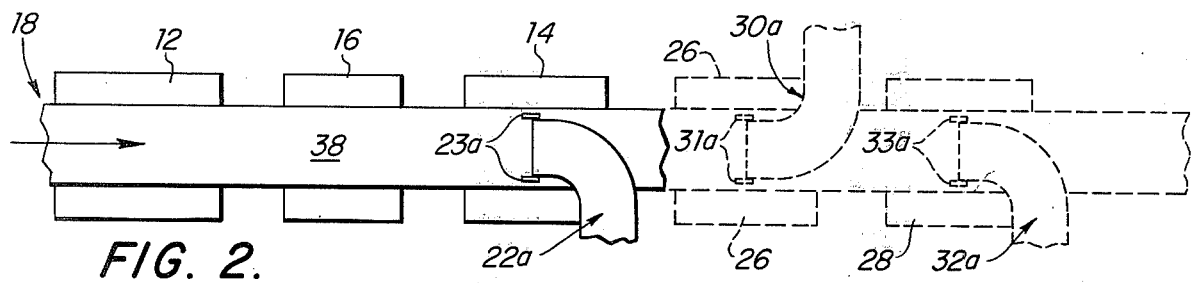
FIG. 2 is a plan view of an alternative configuration of transferor and transferee conveyor belt systems served by a transfer system according to this invention.

In operation, when it is determined that the goods should be delivered to machine 24 instead of machine 20, interrupter unit 12 is first operated to provide a gap in the flow of goods along conveyor belt 38. When this is done, control unit 16 delays operation of transfer unit 14 until that gap created by interrupter unit 12 reaches the area where the transfer will take place. At that point, when the area is free of goods, the transfer unit is operated and delivery begins from transferor conveyor belt system 18 to transferee conveyor belt system 22, and thence on to machine 24. Alternatively, as shown in FIG. 2, where like parts have been given like numbers and similar parts like numbers accompanied by a lower case a, conveyor belts 22a, 30a, and 32a may be curved to divert the goods to machines in other areas. Interrupter unit 12 is aided in its function by the low friction of belt 38 which permits objects 64 to slip; the same low friction is, however, sufficient to permit the objects to move up the inclines created by transfer unit 14.

Figure 4:
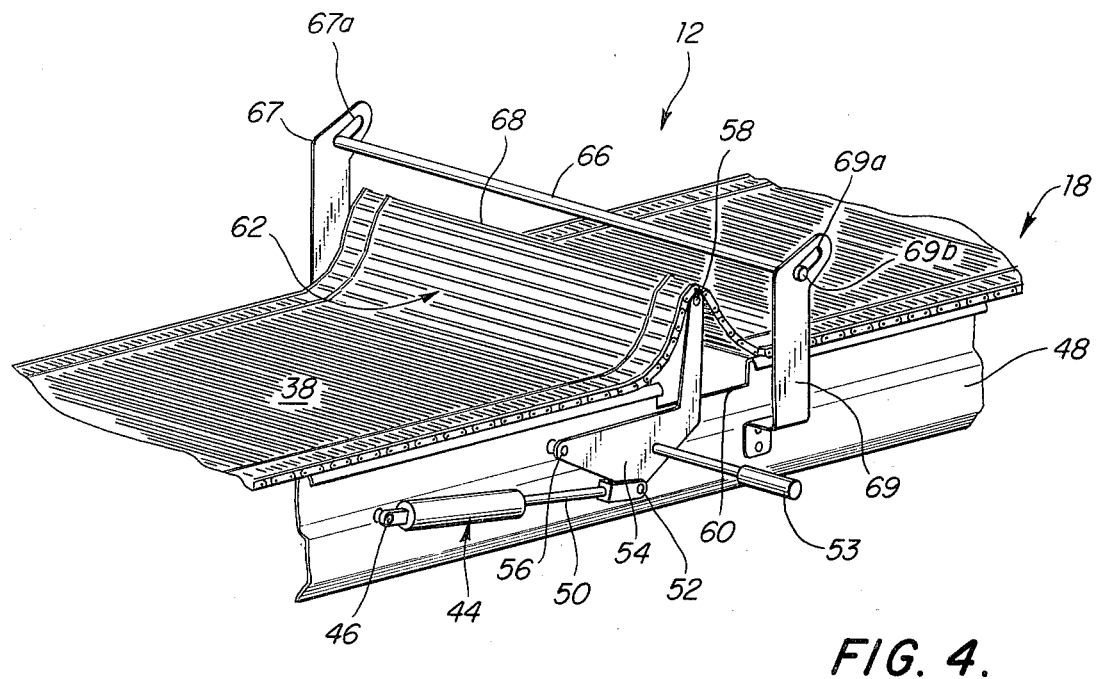
FIG. 4 is a diagrammatic, axonometric view of a portion of an interrupter unit in a raised inclined position according to this invention.

Control unit 16 may include an encoder 40, FIG. 3, driven by belt 38 and a timer mechanism 42. Interrupter unit 12 includes a hydraulic piston 44 rotatably mounted at pivot 46 to the support structure 48 of the transferor conveyor belt system 18. Piston rod 50 of hydraulic cylinder 44 is similarly rotatably attached at pivot 52 to crank mechanism 54, which is rotatably attached at pivot 56 to support structure 48. Cross bar 58, carried by crank 54, normally resides in notch 60 in support 48 when interrupter unit 12 is in the retracted position. However, when retractor unit 12 is in the extended position as shown in FIG. 3, cross bar 58 lifts conveyor belt 38 and creates a steep incline 62 on its upstream side which arrests the flow of goods 64. An additional blocking member, bar 66, is provided in a fixed position proximate the crest 68 of belt 38 in the raised position to further prevent passage of goods 64. Blocking member, bar 66, is supported by upright members 67, 69, FIG. 4, which are fastened at their lower ends to support structure 48. An additional crank (not shown), identical with crank 54, is provided on the opposite side of support structure 48 to receive cross bar 58. A second (not shown) hydraulic cylinder 44 may also be provided.

Transfer unit 14 includes a rotatable plate 70 having a free end 72 and an end 74 which is rotatably attached to support structure 48 at pivot 75. Crank portion 76, fixed with plate 70, is driven by a hydraulic cylinder 78, attached by pivot 80 to support structure 48 and having its piston 82 rotatably attached to crank 76 by pivot 84.

Bar 66, FIG. 5, is positioned to provide a further block to prevent objects 64 from passing over the crest 68 of belt 38 when the cross bar 58 of interrupter unit 14 is in the raised position. However, bar 66 is spaced from the crest 68 at a sufficient distance so that any object 64a which is on or about the downstream side of crest 68 at the time cross bar 58 is raised has sufficient room to pass on through and move down the forward incline 71 of belt 38. Each of members 67, 69 includes an inclined slot 67a, 69a at its upper end in which pins 67b, 69b of bar 66 are slidably supported. Should a conveyed object become wedged between bar 66 and conveyor 18, the force developed on bar 66 would act to drive bar 66 up and away from crest 68 by virtue of the upward and outward direction imposed on bar 66 by slots 67a, 69a.

After interrupter unit 12 has been actuated to raise cross bar 58 to produce a momentary gap in the flow of goods, it is retracted, as shown in FIG. 6, so that cross bar 58 resides in notch 60 and the goods 64 can continue to flow. When the gap 90 created by the action of interrupter unit 12 reaches the area of transfer unit 14, FIG. 6, cylinder 78 is operated to raise plate 70 so that conveyor belt 38 at its free end 72 is in close conveying proximity to conveyor belt 22' at free end 92 of conveyor belt system 22.

Figure 7:
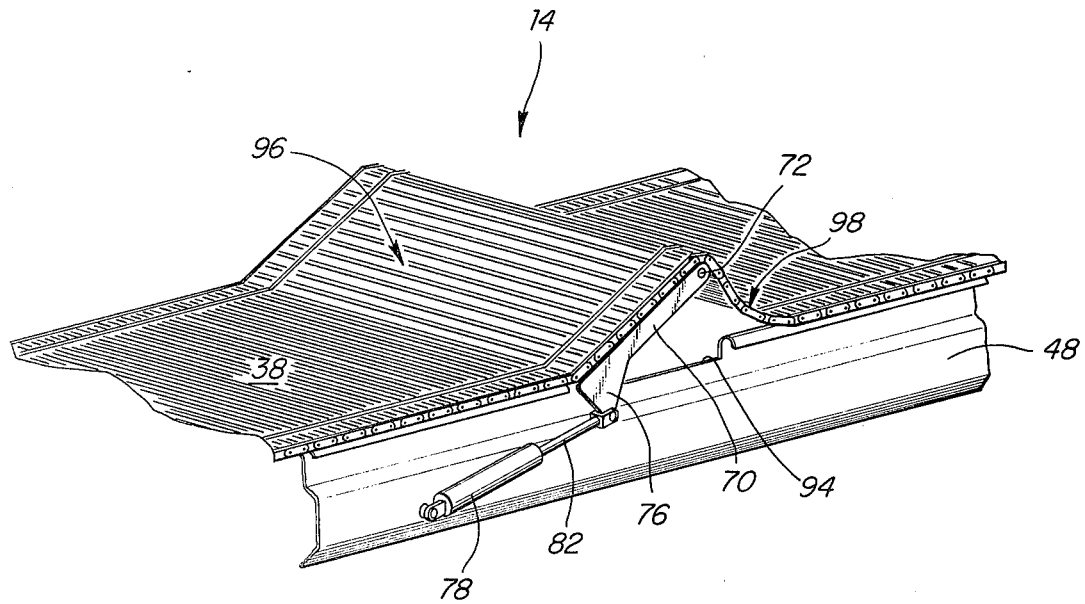
FIG. 7 is an axonometric view of a portion of a conveyor belt system showing a transfer unit in the raised, inclined, position according to this invention viewed in the direction of flow along the conveyor belt.
Figure 8:
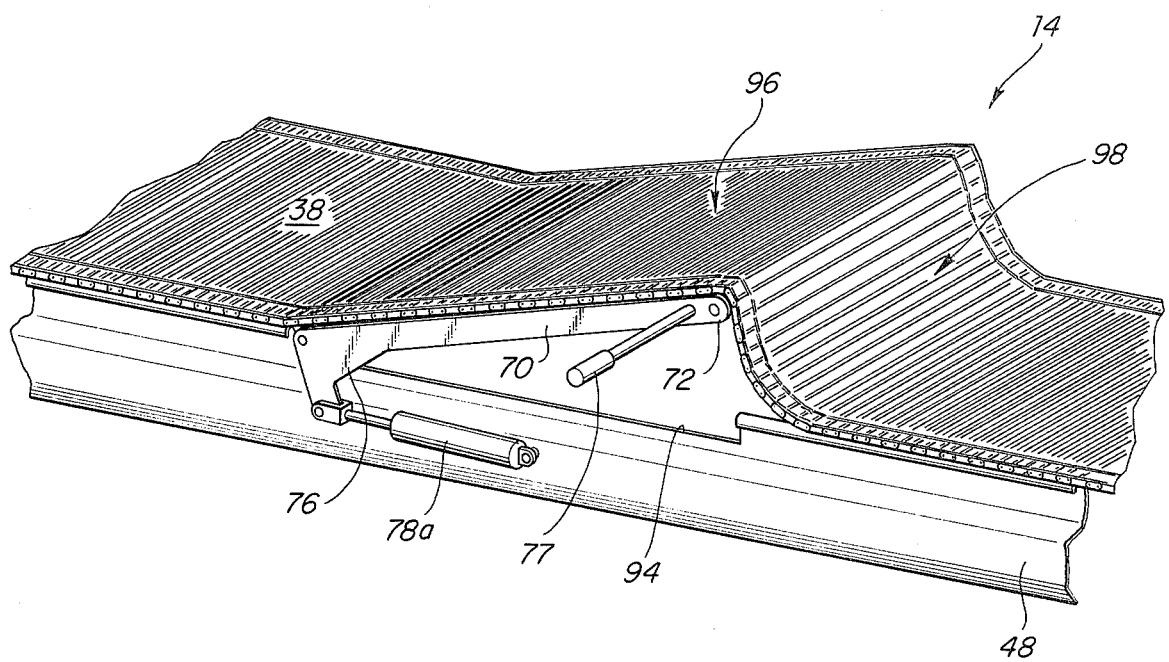
FIG. 8 is an axonometric view of the transfer unit according to this invention in a raised position viewed looking toward the source of the flow of goods along the conveyor belt.

As plate 70 is moved from its retracted position, FIG. 3, in which it rests in notch 94, to its raised or inclined position shown in FIG. 6, it raises conveyor belt 38 with it and creates an incline 96, FIGS. 6 and 7, which bridges the space between transferor conveyor belt system 18 and transferee conveyor belt system 22; belt 38 assumes a declination 98 subsequent to passing over the end 72 of plate 70. Declination 98 is more readily shown in FIG. 8, which includes a hydraulic piston 78a, which pulls plate 70 to the extended inclined position in contrast to cylinder 78, FIG. 7, which pushes plate 70 into that position. An additional crank and hydraulic cylinders (not shown) are used on the other side of plate 70.

Figure 9:
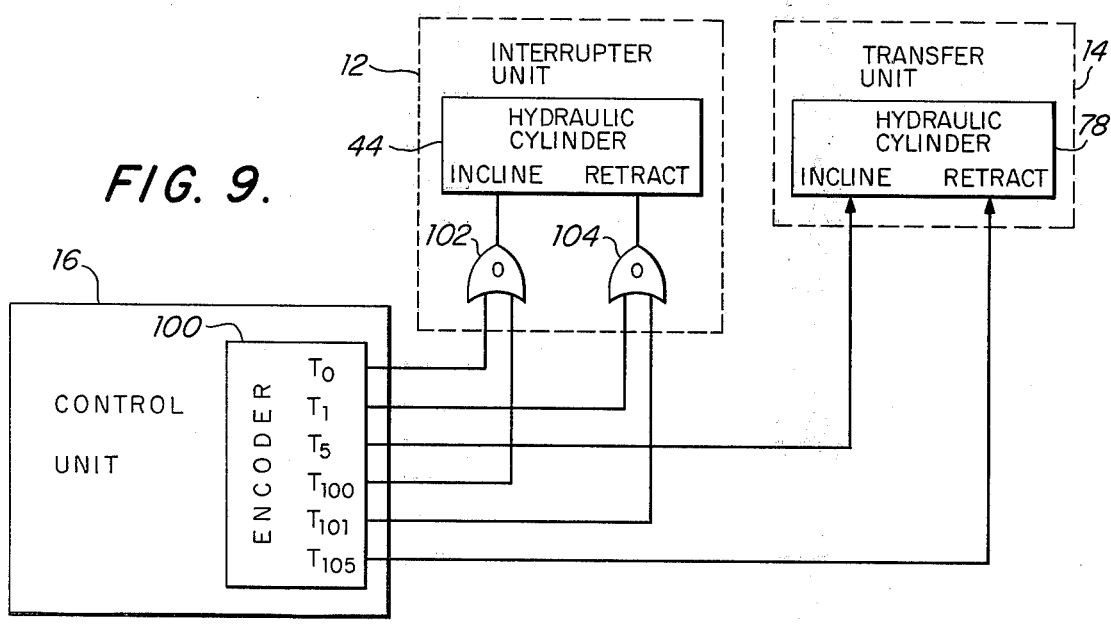
FIG. 9 is a schematic block diagram showing electrical interconnections of the interrupter unit, transfer unit and their controls.
Figure 10:
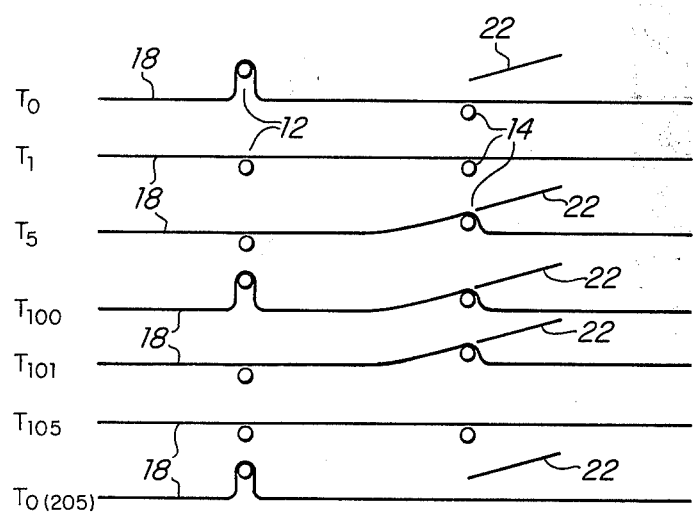
FIG. 10 is a timing diagram indicating the sequence of operation performed by the circuit of FIG. 9.

Both interrupter unit 12 and transfer unit 14, and their respective hydraulic cylinders 44 and 78, may be operated to the inclined position and the retracted position synchronously by means of a single encoder 100, FIG. 9, in control unit 16. Interrupter unit 12 may include a pair of OR gates 102 and 104, which feed the incline and retract inputs, respectively, of hydraulic cylinder 44. The operation can be understood with reference to FIG. 9 and FIG. 10, as the units perform a cycle of operation. At time $T_0$, a signal is provided through OR gate 102 to operate hydraulic cylinder 44 and raise interrupter unit 12 to produce incline 62. After a brief interval at time $T_1$, a signal is provided to OR gate 104 to cause the hydraulic cylinder 44 to retract cross bar 58 into notch 60. When the gap created in the flow of conveyed goods created by this action reaches the area of transfer unit 14, five units of time, or belt motion, later, at time $T_5$, a signal is provided to the inclined input to hydraulic cylinder 78, causing it to raise plate 70 and create incline 96 to bridge the space between transferor conveyor belt system 18 and transferee conveyor belt system 22. After a predetermined period of time, such as for example 95 units of time or belt motion, a signal is provided at time $T_{100}$ through OR gate 102, to hydraulic cylinder 44 to once again actuate the interrupter unit 12 and produce a gap in the flow of goods. At time $T_{101}$ a signal to OR gate 104 causes hydraulic cylinder 44 to retract the interrupter unit 12. When this gap reaches transfer unit 14, at time $T_{105}$, a signal is provided to hydraulic cylinder 78 to retract plate 70 and cause the conveyed goods to resume their travel along conveyor 18. After a predetermined time, for example 100 units, at time $T_{205}$ the cycle may begin again as at time $T_0$.

Although the automatic operation shown in FIG. 9 and even more sophisticated systems may be applied to operate the one or more interrupter units and transfer units according to this invention, that level of sophistication is not necessary according to this invention. For example, interrupter unit 12 may be operated manually by providing a handle 53, FIG. 4, on crank 54 and transfer unit 14 may be similarly manually operated by applying a handle 77, FIG. 8, to crank 76 or plate 70.

Figure 11:
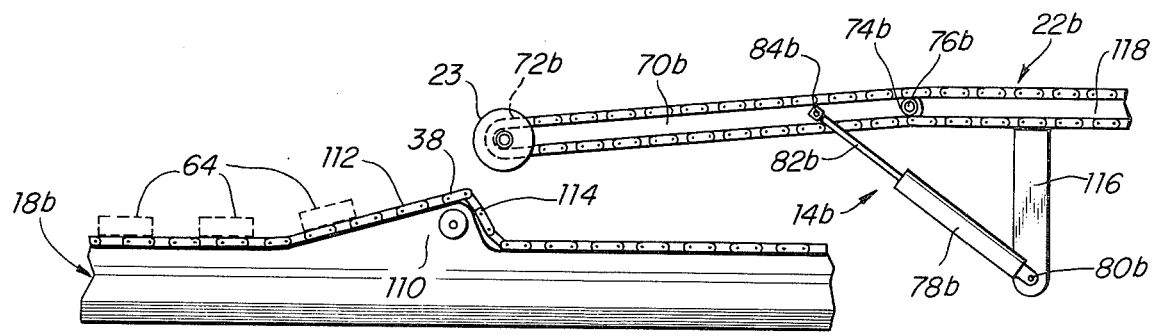
FIG. 11 is a schematic elevational view of an alternative construction of a transfer unit according to this invention in the retracted position.

Although thus far the invention has been described with respect to the transfer unit being associated with the transferor conveyor belt system, this is not a necessary limitation of the invention. For example, as shown in FIG. 11, where like parts are given like numbers accompanied by a lower case letter, transferor conveyor belt system 18b may be provided with a raised portion 110 that gradually lifts belt 38 along incline 112 and less gradually drops it along incline 114. Transfer unit 14b, associated with transferee conveyor belt system 22b, includes hydraulic cylinder 78b and is fixed at pivot 80b to member 116 of support structure 118 of conveyor belt system 22b. A rotatable section or plate 70b having one free end 72b and end 74b rotatably fixed at pivot 75b to structure 118, is rotatably attached to piston 82b at pivot 84b.

Figure 12:
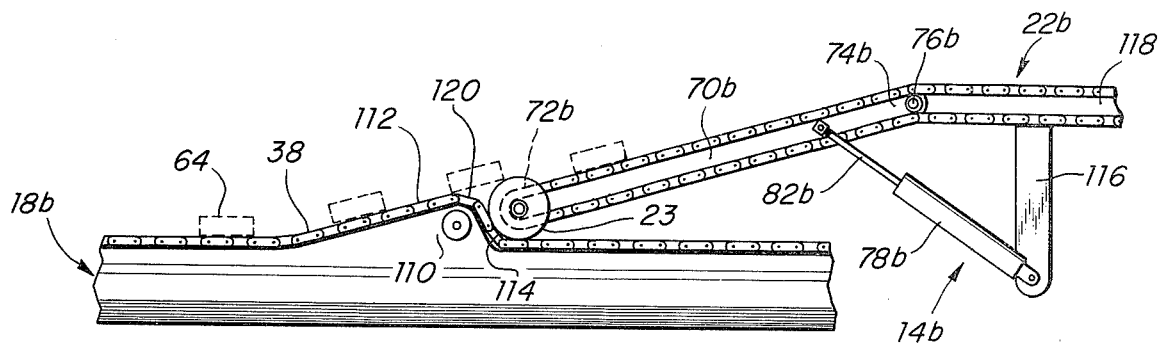
FIG. 12 is a view similar to FIG. 11 with the transfer unit in the inclined position.

When hydraulic cylinder 78b is actuated to move plate 70b from the retracted position shown in FIG. 11 to the inclined or bridging position shown in FIG. 12, the conveyor belt, moving about end 72b of plate 70b, comes in close proximity to the crest 120 at the top of incline 112 and depresses or comes close to decline 114 on the downstream side of raised portion 110.

Drive unit 130, FIG. 13, for transferee conveyor system 22 includes a pressure block 132 which holds belt 22a against sprocket 134 mounted in bearings 136 (only one shown) and driven by a motor (not shown). Drive unit 138 of transferor conveyor system 18 includes an idler roller 140 supported on bearings 142 (only one shown) and sprocket 144 supported in bearings 146 (only one shown) driven by a motor (not shown). Additionally a second, slack take-up roller 150 mounted in inclined slots 152 (only one shown) is used to provide tensioning yet allow slack to permit the interrupter 12 and transfer 14 units to operate.

Other embodiments will occur to those skilled in the art and are within the following claims.

What is claimed is:

1. An interrupter unit for producing a gap in the normal flow of product along a conveyor belt of a conveyor system comprising: drive means; and actuator means responsive to said drive means for raising a limited portion of the conveyor belt relative to the remainder of the conveyor belt on either side of the raised portions of the conveyor system to produce an inclination of the conveyor belt to prevent further progress of conveyed objects, said actuator means including a crank mechanism and a cross bar disposed beneath the upper and lower lengths of the conveyor belt and fixed to said crank mechanism for raising the upper length of the conveyor belt independent of the lower length.

2. The interrupter circuit of claim 1 further including control means for enabling said drive means to operate said actuator means to raise the conveyor belt and create a gap in the flow of product.

3. The interrupter unit of claim 1 further including a blocking member disposed closely adjacent to the crest of the conveyor belt in the raised position for further preventing progress of conveyed objects.

4. The interrupter unit of claim 1 in which said control unit includes encoder means for enabling said drive means to operate said actuator means in response to motion of the conveyor belt.

5. A transfer unit for transferring conveyed objects between first and second conveyor systems, each including a conveyor belt, one of said first and second conveyor systems being the transferor system, the other being the transferee system, comprising:
 a rotatable support section for carrying at least a portion of a conveyor belt of the first conveyor system and having a free end and an end rotatably interconnected with the support structure of the first conveyor system; and
 a drive mechanism for rotating said support section between a retracted position and an inclined position bridging said first and second conveyor systems, with the conveyor belt of the first conveyor system at the free end of said section in close conveying proximity to the conveyor belt of the second conveyor system;
 said first conveyor system being above said second conveyor system and said rotatable support section lowering the conveyor belt of said first conveyor belt system to create a downward incline towards said free end and the conveyor belt of the second conveyor system, and said second conveyor system including a raised portion defining an inclined platform for its conveyor belt, approaching the junction with the conveyor belt of the first conveyor system at the free end of said rotatable support section and a decline following that junction.

6. The transfer unit of claim 5 in which said first conveyor system is below said second conveyor system and said rotatable support section raises the conveyor belt of said first conveyor system to create an upward incline towards said free end and the conveyor belt of the second conveyor system.

7. A transfer system for periodically transferring conveyed objects between first and second conveyor systems, each including a conveyor belt, one of said first and second conveyor systems being the transferor system, the other being the transferee system, comprising:

a transfer unit including a rotatable support section for carrying at least a portion of the conveyor belt of the first conveyor system and having a free end and an end rotatably interconnected with the support structure of the first conveyor system; and a drive mechanism for rotating said support section between a retracted position and an inclined position bridging said first and second conveyor systems with the conveyor belt of the first conveyor system at the free end of said section in close, conveying, proximity to the conveyor belt of the second conveyor system; and an interrupter unit for producing a gap in the normal flow of product along the one of the first and second conveyor systems which is the transferor system during which said rotatable support section switches between its retracted position and its inclined position, including drive means; and actuator means including a crank mechanism and a cross bar disposed beneath the conveyor belt and fixed to the crank mechanism responsive to said drive means for raising a limited portion of the conveyor belt of the one of the first and second conveyor systems which is the transferor system, to produce an inclination of the conveyor belt to prevent further progress of conveyed objects.

8. The transfer system of claim 7 further including control means for enabling said drive means to operate said actuator means to raise the conveyor belt and create a gap in the flow of the product, and synchronously enabling said drive mechanism to periodically retract and incline said rotatable support section concurrently with the occurrence of the gaps created by said interrupter unit.

* * * * *